US011588402B2

(12) United States Patent
Veselic (10) Patent No.: US 11,588,402 B2
(45) Date of Patent: Feb. 21, 2023

(54) SYSTEMS AND METHODS FOR CHARGING A BATTERY

(71) Applicant: FUNDAMENTAL INNOVATION SYSTEMS INTERNATIONAL LLC, Flower Mound, TX (US)

(72) Inventor: Dusan Veselic, Oakville (CA)

(73) Assignee: FUNDAMENTAL INNOVATION SYSTEMS INTERNATIONAL LLC, Flower Mound, TX (US)

( * ) Notice: Subject to any disclaimer, the term of this patent is extended or adjusted under 35 U.S.C. 154(b) by 512 days.

(21) Appl. No.: 16/614,604

(22) PCT Filed: May 18, 2018

(86) PCT No.: PCT/US2018/033386
§ 371 (c)(1),
(2) Date: Nov. 18, 2019

(87) PCT Pub. No.: WO2018/217565
PCT Pub. Date: Nov. 29, 2018

(65) Prior Publication Data
US 2020/0112253 A1  Apr. 9, 2020

Related U.S. Application Data

(60) Provisional application No. 62/509,419, filed on May 22, 2017.

(51) Int. Cl.
*H02M 3/158* (2006.01)
*G06F 1/26* (2006.01)
(Continued)

(52) U.S. Cl.
CPC ............ *H02M 3/1582* (2013.01); *G06F 1/26* (2013.01); *H02J 1/102* (2013.01); *H02J 7/0068* (2013.01); *H02J 9/061* (2013.01)

(58) Field of Classification Search
CPC ......... H02M 3/1582; G06F 1/26; H02J 1/102; H02J 7/0068; H02J 9/061
(Continued)

(56) References Cited

U.S. PATENT DOCUMENTS 6,936,936 B2  8/2005  Fischer et al.
7,170,259 B2  1/2007  Veselic
(Continued)

FOREIGN PATENT DOCUMENTS

EP          1798835 A1 *  6/2007  ............ H02J 7/0068
KR   10-2012-0101108 A    9/2012
(Continued)

OTHER PUBLICATIONS

The Extended European Search Report for European Patent Application No. 18805860.6 dated Sep. 22, 2021 (11 pages).
(Continued)

*Primary Examiner* — Suresh Memula
(74) *Attorney, Agent, or Firm* — Botos Churchill IP Law LLP (57) ABSTRACT

The present technology relates to systems and methods for rapidly charging a battery of a device when the device is attached to an AC adapter. Some embodiments of the present disclosure describe an activation circuit in an AC adaptor and a detection circuit in a downstream device that cooperatively ensure optimal power delivery. Some embodiments of the present disclosure describe a device with a system load, a battery, and a control circuit, wherein the control circuit is configured to provide the battery with a charging current of Ibat=Imax−Isys when the device is in a USB compliant mode of operation and a charging current of Ibat=Imax when the device is connected to an AC adapter.

9 Claims, 8 Drawing Sheets

(51) Int. Cl.
    *H02J 1/10* (2006.01)
    *H02J 7/00* (2006.01)
    *H02J 9/06* (2006.01)
(58) Field of Classification Search
    USPC .................................................... 320/137
    See application file for complete search history.

(56) References Cited

U.S. PATENT DOCUMENTS

| | | | |
|---|---|---|---|
| 7,479,762 B2 | 1/2009 | Bayne et al. | |
| 8,745,301 B2 | 6/2014 | Hawawini et al. | |
| 9,564,772 B2* | 2/2017 | Qiu | H02J 7/00714 |
| 2004/0075418 A1* | 4/2004 | Densham | H02J 7/0068 |
| | | | 320/111 |
| 2005/0024016 A1 | 2/2005 | Breen et al. | |
| 2007/0132427 A1* | 6/2007 | Veselic | H02J 7/00 |
| | | | 320/111 |
| 2009/0004981 A1* | 1/2009 | Eliezer | H03F 1/3247 |
| | | | 455/127.1 |
| 2011/0099802 A1 | 5/2011 | Veselic | |
| 2011/0128153 A1* | 6/2011 | Sims | G06F 1/325 |
| | | | 307/66 |
| 2011/0133700 A1 | 6/2011 | Martin et al. | |
| 2011/0298433 A1* | 12/2011 | Tam | H01F 38/00 |
| | | | 323/282 |
| 2014/0098577 A1 | 4/2014 | Schroeder gen Berghegger | |
| 2015/0069976 A1* | 3/2015 | Yamanaka | H02J 7/00714 |
| | | | 320/164 |
| 2015/0280573 A1* | 10/2015 | Gong | H02M 3/33592 |
| | | | 363/21.14 |
| 2015/0357815 A1* | 12/2015 | Luh | H02J 7/0063 |
| | | | 307/31 |
| 2017/0279359 A1* | 9/2017 | Goncalves | H02M 1/088 |
| 2018/0090945 A1* | 3/2018 | Langlinais | H02J 7/0045 |
| 2018/0136680 A1* | 5/2018 | Du | G05F 1/575 |
| 2019/0339655 A1* | 11/2019 | Evans | G05F 1/625 |

FOREIGN PATENT DOCUMENTS

| | | | | |
|---|---|---|---|---|
| WO | WO-2011081255 A1 * | 7/2011 | ........ | H02M 3/33523 |
| WO | WO-2012094518 A2 * | 7/2012 | ........... | H02J 7/0044 |
| WO | WO-2021059174 A1 * | 4/2021 | | |

OTHER PUBLICATIONS

Partial Supplementary European Search Report for corresponding European Patent Application No. 18 80 5860.6 dated Apr. 1, 2021 (12 pages).

PCT International Search Report issued in corresponding PCT application PCT/US2018/033386 dated Sep. 19, 2018.

* cited by examiner

SYSTEMS AND METHODS FOR CHARGING A BATTERY

CROSS REFERENCE TO RELATED APPLICATIONS

The present application is a national phase entry under 35 U.S.C. § 371 of International Application No. PCT/US2018/033386, filed May 18, 2018, published in English, which application claims the benefit of the filing date of U.S. Provisional Application No. 62/509,419, filed May 22, 2017, the disclosures of which are hereby incorporated herein by reference.

TECHNICAL FIELD

The present technology concerns charging systems for devices, such as mobile device and computers. More specifically, it relates to systems and methods for charging a battery of a device when the device is attached to an alternating current (AC) adapter.

BACKGROUND

Convenient, faster and more efficient charging solutions are needed to address current consumer demands. To minimize charging times, a downstream device (e.g., mobile phone, rechargeable speaker, etc.) preferably allocates the maximum amount of current to its battery that is permitted by the size and/or chemistry of that battery. Presently, standardized communications interfaces, such as universal serial bus (USB) interfaces, provide a convenient mechanism for consumers to charge their electronic devices. However, the specifications associated with these standardized communications interfaces often limit the amount of power that can be supplied to downstream devices.

In standardized communications interfaces, a majority of the power is often delivered to the downstream device during a constant current (CC) mode. Thus, current often plays a pivotal role, while voltage merely complements the overall power needs of the downstream device. This is demonstrated by the equations below where $P_{VDD}$ is the power delivered to a downstream device, $P_{max}$ is the maximum power that can be delivered to the downstream device through the standardized communications interface, $P_{sys}$ is the power delivered to the system load, $P_{bat}$ is the power delivered to the battery, $I_{max}$ is the maximum amount of current that can be delivered to the downstream device through the standardized communications interface, $I_{sys}$ is the amount of current required by the system load, and $I_{bat}$ is the current available for charging the battery:

$$P_{VDD} = P_{max}$$

where $I_{bat} = I_{max} - I_{sys}$ and $P_{max} = P_{sys} + P_{bat}$

Total power consumption, operational losses and efficiency requirements are also factors to consider when dealing with various cables (e.g., USB cables) and switching regulators (e.g., a buck-boost control circuit). In this landscape, it is a challenge to simultaneously: (a) comply with the maximum current ratings of standardized communications interfaces and (b) rapidly and efficiently charge the battery of a downstream device.

A typical solution for devices with a USB interface, and current industry standard, is Qualcomm's Quick-Charge technology. This technology allows a downstream device to request power from an AC adapter in predetermined voltage increments. Specifically, depending on the version of the implemented specification (i.e., 1.0, 2.0, 3.0, and soon 4.0), a downstream device can request the following:

|  | 1.0 | 2.0 | 3.0 | 4.0 |
|---|---|---|---|---|
| Voltage: | 5 V | 5/9/12 V | 3.2/5/9/12/20 V | 5/9/3.0-5.9/3.6-20 V |
| Current: | 2 A | 3 A | 1.5-3 A | 3/2.5-4.6 A |
| Total Power: | 10 W | 18 W | 18 W | 18 W/27 W |

One problem with this solution is the fact that power needs to be negotiated and allocated. Furthermore, since power can only be delivered in predetermined voltage increments, the AC adapter may not be matching the exact power needs of the downstream device. This creates an inherent variation in charger efficiency. For example, the efficiency of a buck regulator decreases as the input voltage increases. Furthermore, delivering excessive voltage to a downstream device increases the amount of power dissipation (i.e., power loss) across the cable connecting the AC adapter to the downstream device.

Moreover, in the case of an AC adapter with, for example, a USB output connector, the only power limitation is the output power capability of the AC adapter. This presents an opportunity to have the output path from the charger managed such that the power requirements of a system load and a battery of a downstream device are summed. This relationship is demonstrated by the equations below where $P_{VDD}$ is the power delivered to a downstream device, $P_{max}$ is the maximum power that can be delivered to the downstream device through the standardized communications interface, $P_{sys}$ is the power delivered to the system load, $I_{max}$ is the maximum amount of current that can be delivered to the downstream device through the standardized communications interface, $I_{sys}$ is the amount of current required by the system load, and $I_{bat}$ is the current available for charging the battery:

$$P_{max} = (P_{connection\_loss} + P_{VDD}) = (P_{conversion\_loss} + P_{sys} + P_{bat\_chrg})$$

where $I_{bat} = I_{max}$

Current industry solutions also fail to fully exploit the relationship described above. For example, in one current industry solution, a downstream device may implement a current split for battery voltages below a minimum threshold of a system load. The current split is implemented after the battery charger and thus makes the maximum charging current the limit of the total current available to the system and the battery. In such implementations, when the battery voltages are above the minimum threshold, the system load and the battery of the downstream device are connected such that the converted current provided by an AC adapter is shared between the two and the total limit is again imposed by the maximum battery charging current limit. In another current industry solution, a downstream device may provide separate paths for delivering power from an AC adapter to a system load or a battery. In this type of downstream device, there is no path directly connecting the battery to the system load. This configuration typically needs multiple current limiters and therefore creates a stock-up of tolerances, which leads to a reduction of the total current available from USB host. In yet another current industry solution, a system load is supplied directly from the battery through a buck-boost control circuit. However, this implementation, by default, limits the maximum charge current to:

$$I_{bat\_charge} = I_{bat} - I_{sys}.$$

BRIEF SUMMARY

One aspect of the present disclosure relates to an apparatus for adapting an alternating current to a direct current, the apparatus comprising: (1) a power supply input terminal for the apparatus, the power supply input terminal configured to removably couple to an alternating current (AC) power source and to receive the alternating current; (2) a switched mode power supply (SMPS) configured to operate with energy supplied from the AC power source via the power supply input terminal, the SMPS configured to generate a supply voltage for a direct current (DC) charger circuit supplied by the SMPS; the SMPS further configured to adjust a voltage level of the supply voltage depending on a feedback signal applied at a feedback input to the SMPS; (3) input terminals configured to receive signals from the DC charger circuit, wherein at least one of the received signals is an analog signal responsive to a drop in the supply voltage in the DC charger circuit, (4) an activation circuit coupled to the input terminals, the activation circuit to activate the feedback signal to increase the voltage level in response to the at least one of the received signals; and (5) an output terminal from the apparatus, the output terminal configured to provide the voltage level from the SMPS for operating the DC charger circuit.

In some embodiments, the activation circuit comprises a first operational amplifier and a first transistor, wherein the first operational amplifier is configured to compare the received signals from the input terminals and activate the first transistor to change a voltage signal at the feedback input from the comparison.

In some embodiments, the activation circuit includes a filter circuit coupled to at least one of the input terminals, wherein the filter circuit is configured to filter a reference signal applied to the first operational amplifier.

In some embodiments, the apparatus further comprises a DC charger circuit, wherein the DC charger circuit includes a detection circuit configured to detect the drop in the supply voltage in the DC charger circuit, the detection circuit comprising a second operational amplifier configured to compare the supply voltage and a predetermined voltage.

In some embodiments, the detection circuit further comprises a second transistor coupled to an output of the second operational amplifier, the second transistor configured to induce the at least one of the received signals.

In some embodiments, the predetermined voltage is a sum of a system supply voltage level and a reference voltage level, wherein the detection circuit further comprises an adder circuit configured to produce the predetermined voltage from the system supply voltage level and the reference voltage level.

In some embodiments, the apparatus further comprises a universal serial bus cable including a pair of data lines, and wherein the received signals are transmitted over the data lines.

In some embodiments, the activation circuit and the detection circuit operate with the switched mode power supply to maintain a substantially constant supply voltage for the DC charger circuit.

In some embodiments, the apparatus further comprises a flexible wire bus, wherein wires of the flexible wire bus are adapted to couple with terminals of the DC charger circuit and the input terminals of the apparatus.

In some embodiments, the flexible wire bus is a universal serial bus cable.

Another aspect of the present disclosure relates to an apparatus for charging a battery from an alternating current (AC) adapter, the apparatus comprising: a direct current (DC) charger circuit, the direct current (DC) charger circuit configured to operate by a supply voltage (Vin) provided via a bus by a switched mode power supply (SMPS) of the alternating current (AC) adapter; and a detection circuit configured to detect a drop in the supply voltage (Vin) and generate an analog feedback signal to an activation circuit of the alternating current (AC) adapter, the feedback signal enabling an increase in the supply voltage (Vin); wherein the detection circuit is configured to generate the feedback signal on a data line coupling the detection circuit with the activation circuit, whereby a substantially constant supply voltage is maintained for the direct current (DC) charger circuit.

In some embodiments, the detection circuit comprises an operational amplifier configured to compare the supply voltage (Vin) and a predetermined voltage.

In some embodiments, the detection circuit further comprises a transistor coupled to an output of the operational amplifier, the transistor configured to induce the feedback signal.

In some embodiments, the predetermined voltage is a sum of a system supply voltage level and a reference voltage level, wherein the detection circuit further comprises an adder circuit configured to produce the predetermined voltage from the system supply voltage level and the reference voltage level.

In some embodiments, the data line is a data line of a universal serial bus cable.

Yet another aspect of the present disclosure relates to a device comprising: (1) an over-voltage protection circuit configured to monitor power delivered to the device through VBUS and GND lines of a Universal Serial Bus (USB) interface and produce a first signal indicating whether any over-voltage conditions are present across the VBUS and GND lines of the USB interface; (2) an AC detection circuit configured to monitor the D+ and D− lines of the USB interface and produce a second signal indicating whether an AC adapter is connected to the device; and (3) a control circuit configured to: (a) turn "on" a first transistor and turn "off" a second transistor if the first and second signals indicate that no overload condition is present and an AC adapter is connected to the device, wherein turning the first transistor "on" and turning the second transistor "off" allows power from the USB interface to be delivered through at least two separate paths wherein one path is to a system load and a second path is to a battery through a regulator an SMPS circuit; and (b) turn "off" the first transistor and turn "on" the second transistor if the first or second signals indicate that no overload condition is present and an AC adapter is not connected to the device, wherein turning the first transistor "off" and turning the second transistor "on" allows power delivery from the USB interface though a shared path to the system load and the battery via the regulator SMPS circuit.

In some embodiments, turning the second transistor "on" shorts a first diode, wherein the first diode is configured to allow current to flow toward the system load.

In some embodiments, the first signal is also used to control a third transistor, wherein turning the third transistor "off" prevents all power from the $V_{BUS}$ and GND lines of the USB interface from being delivered to the system load and the battery.

In some embodiments, the control circuit comprises: one or more logic gates; a first operational amplifier; a first pair of resistors; and a fourth transistor, wherein the one or more logic gates turn "on" the fourth transistor if the first and second signals indicate that no overload conditions are present and an AC adapter is connected to the device, and wherein turning the fourth transistor "on" causes an output of the first operational amplifier to be pulled into a high state, and wherein the first transistor is "on" and the second transistor is "off" if the output of the first operational amplifier is high, and wherein the first pair of resistors are connected to the first operational amplifier such that they add hysteresis around a switching threshold of the first operational amplifier.

In some embodiments, the SMPS circuit comprises: a fifth transistor; a sixth transistor; and a switch control circuit configured to turn the fifth and sixth transistors "on" or "off" in order to regulate an amount of power delivered to the system load or the battery.

In some embodiments, turning the fifth transistor "on" shorts a second diode, wherein the second diode is configured to allow current to flow away from the system load and the battery, and turning the sixth transistor "on" shorts a third diode, wherein the third diode is configured to allow current to flow toward the system load and the battery.

In some embodiments, the device further comprises a separation circuit configured to isolate the battery if a voltage across the battery falls below a predetermined minimum voltage required for the system load.

In some embodiments, the separation circuit comprises: a seventh transistor; a second operational amplifier having a first and second input; and a second pair of resistors, wherein the second pair of resistors divide an input voltage and provide the divided input voltage to the first input of the second operational amplifier, and wherein second input of the second operational amplifier is connected to a reference voltage, and wherein the second operational amplifier turns the seventh transistor "off" if the divided input voltage is less than the reference voltage.

In some embodiments, turning the seventh transistor "on" shorts a fourth diode, wherein the fourth diode is configured to allow current to flow away from the battery.

In some embodiments, the device further comprises a buck-boost circuit configured to regulate voltage when the device is acting as a peripheral device and boost voltage when the device is acting as a host device.

DETAILED DESCRIPTION

Embodiments of the present disclosure are described in detail with reference to the drawing figures wherein like reference numerals identify similar or identical elements. It is to be understood that the disclosed embodiments are merely examples of the disclosure, which may be embodied in various forms. Well-known functions or constructions are not described in detail to avoid obscuring the present disclosure in unnecessary detail. Therefore, specific structural and functional details disclosed herein are not to be interpreted as limiting, but merely as a basis for the claims and as a representative basis for teaching one skilled in the art to variously employ the present disclosure in virtually any appropriately detailed structure.

Some embodiments of the present technology may include an activation circuit in an AC adaptor and a detection circuit in a downstream device that cooperatively ensure optimal power delivery. These circuits implement a feedback loop relating to the voltage across the system load ($V_{sys}$) and/or the voltage at the input of a charger circuit ($V_{DD}$) of a downstream device. Based on feedback concerning $V_{sys}$ and/or $V_{DD}$, the activation circuit of the AC adapter changes the amount of voltage supplied to the downstream device. For example, if $V_{DD}$ falls below a determined threshold (e.g., 5V), the AC adapter may increase the amount of voltage delivered to the downstream device. In some embodiments, these adjustments are automatically controlled by, for example, a plurality of analogue components. In such embodiments, the power needs of a downstream device can be met without any need for the device to negotiate with the AC adapter via, for example, a data communication protocol on the data lines of a USB interface.

Some embodiments of the present technology may include a downstream device with a system load, a battery, and a control circuit, wherein the control circuit is configured to provide the battery with a "restricted" charging current of $I_{bat}=I_{usb\_max}-I_{sys}$ when the downstream device is in a USB compliant mode of operation and an "unrestricted" charging and system current when the downstream device is connected to an AC adapter. Thus, the maximum available current is always allocated to both the system load and the battery. As a result, the time required to charge the battery is reduced.

A. Feedback Circuit

Figure 1:
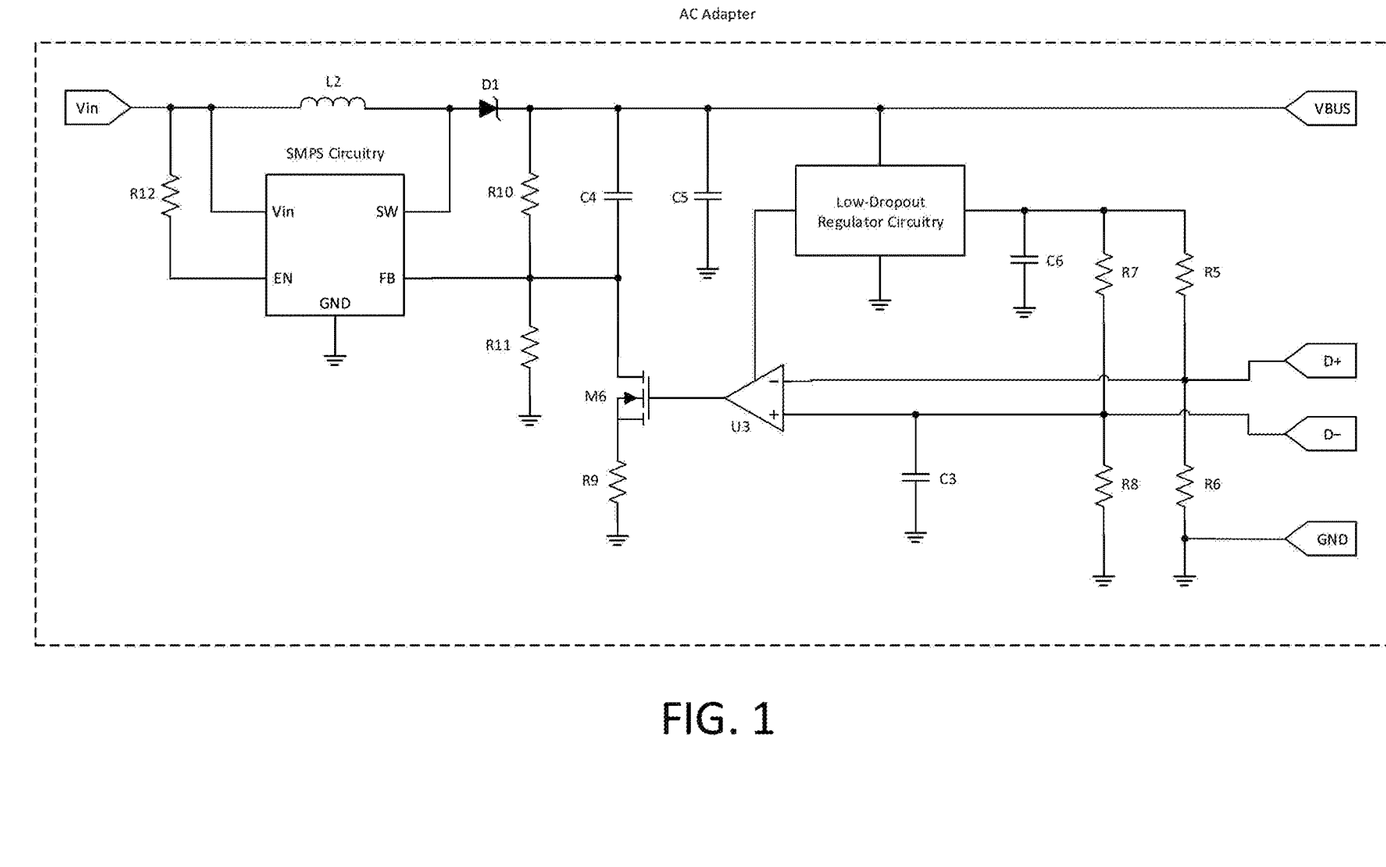
FIG. 1 illustrates an example circuit within an AC adapter in accordance with the present technology.

FIG. 1 illustrates an example circuit within an AC adapter in accordance with some versions of the present technology. As shown in FIG. 1, the AC adapter includes a USB interface comprising VBUS, GND, D+, and D− lines. The VBUS and GND lines may be used to transfer power to and from a downstream device. The D+ and D− lines may be configured to couple to data lines of a downstream device. The USB interface may include additional lines. For example, some types of USB interfaces include an ID pin, which can be used for implementing USB On-The-Go (OTG). Other types of standardized interfaces may be used to transfer power to the device, such as, for example, Power over Ethernet (PoE).

The circuit illustrated in FIG. 1 also includes transistor M6, operational amplifier U3, capacitor C3, and resistors R5, R6, R7, R8, and R9. Collectively, these components form an example activation circuit. The activation circuit responds to feedback from a detection circuit in a downstream device. As shown in FIG. 1, the D+ and D− lines are held/set by the AC adapter to be at predetermined voltages levels (e.g., "high" or "low"). These voltages are determined by resistors R5, R6, R7, and R8. Specifically, the D+ line, which is also connected to the negative input of operational amplifier U3, is connected to a resistor divider comprising resistors R5 and R6. Furthermore, the D− line, which is also connected to the positive input of operational amplifier U3, is connected to a resistor divider comprising resistors R7 and R8. In this embodiment, the D− line provides a reference signal and the D+ line provides the feedback signal. However, in other embodiments, the roles of the D+ and D− lines may be reversed. The reference line (e.g., the D− line) may also include a filter. For example, as shown in FIG. 1, a low-pass RC filter is implemented by capacitor C3 and resistors R7 and R8. Collectively, capacitor C3 and resistors R7 and R8 provide a time constant for the filtering of the reference input.

As shown in the example of FIG. 1, the output signal of operational amplifier may be pulled high when the voltage at its positive input is greater than the voltage at its negative input. Conversely, the output signal of operational amplifier may be pulled low when the voltage at its positive input is less than, or equal to, the voltage at its negative input. Thus, the output of operational amplifier U3 can be used to control transistor M6. As shown in FIG. 1, transistor M6 is an N-channel enhancement-mode metal-oxide semiconductor field-effect transistor (MOSFET). Thus, transistor M6 is "on" when the voltage across transistor M6's gate and source ($V_{gs}$) is greater than transistor M6's threshold voltage ($V_{th}$). Conversely, transistor M6 is "off" when $V_{gs}$ is less than $V_{th}$. Stated another way, transistor M6 is "on" when the voltage at the output of operational amplifier U3 is above a certain threshold. Similarly, transistor M6 is "off" when the voltage at the output of operational amplifier U3 is below a certain threshold. In other embodiments, transistor M6 may be replaced with an P-channel MOSFET. In other embodiments, transistor M6 may be replaced with a different type of transistor altogether, such as, for example, a bipolar junction transistor (BJT) or a junction field-effect transistor (JFET). Furthermore, in other embodiments, additional transistors and/or other circuit components may be added to the activation circuit.

As shown in FIG. 1, when transistor M6 is "on", the voltage level applied to the feedback (FB) input of the switched-mode power supply (SMPS) is reduced. The FB input of an SMPS is often used to control the voltage level that is output via a divider/filter network (e.g., capacitor C4 and resistors R10 and R11). As shown in FIG. 1, the reduced voltage level activated by transistor M6 simulates a need for the SMPS to increase the output voltage via inductor L2, diode D1, and capacitor C5 to the VBUS line. In some embodiments, the voltage level at the VBUS line may be capped just below a voltage that triggers an over-voltage event in a downstream device (e.g., 5.8V).

Figure 2:
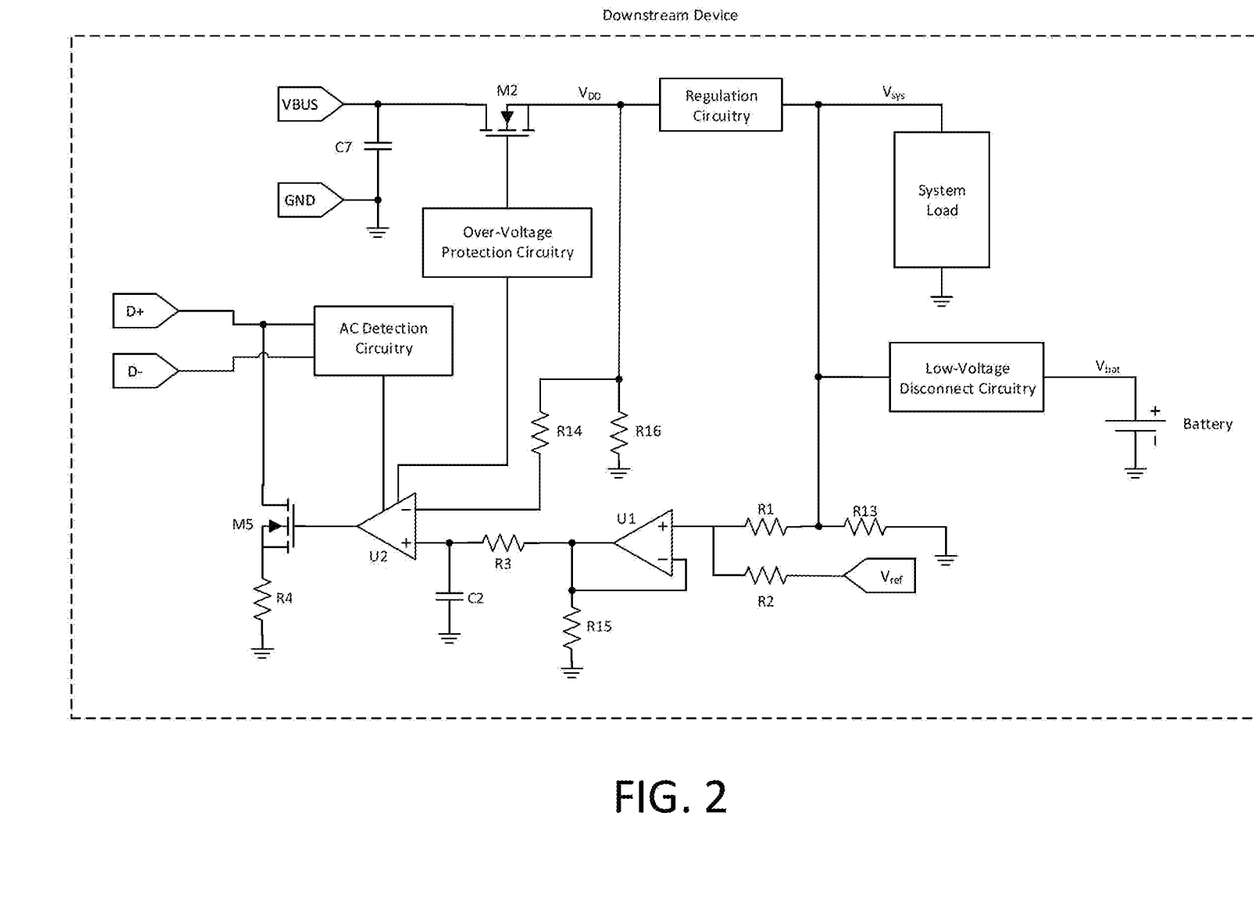
FIG. 2 illustrates an example charger circuit within a device in accordance with the present technology.

FIG. 2 illustrates an example charger circuit within a device in accordance with the present technology. As shown in FIG. 2, the device includes a system load and a battery. The system load may include one or more processors, memories, communications subsystems, and/or sensors. The battery may, for example, be a lithium ion battery, a lithium polymer battery, a nickel cadmium battery, or a nickel metal hydride battery. The battery may also consist of a plurality of battery cells connected in series and/or parallel. For the purposes of the discussion below, the device of FIG. 2 will primarily be acting as a downstream device that is receiving power through the USB interface. However, the device may be capable of acting as a host or upstream device.

The circuit illustrated in FIG. 2 also includes transistor M5, operational amplifiers U1 and U2, capacitor C2, and resistors R1, R2, R4, R13, R14, R15, and R16. Collectively, these components form an example detection circuit. The detection circuit generates a feedback signal that can be sent to an activation circuit of an AC adapter (e.g., the AC adapter of FIG. 1). As shown in FIG. 2, the feedback signal is sent to an activation circuit of an AC adapter via the D+ line of a USB interface. However, in other embodiments, a different line of the USB interface, such as the D− line, can be used for this purpose.

As shown in FIG. 2, the voltage level on the D+ line is controlled/varied by operations of transistor M5 and operational amplifier U2. Operational amplifier U2 is coupled to the gate of transistor M5. The inputs of operational amplifier U2 are used to detect a voltage drop at the charger. As shown in FIG. 2, the positive input of operational amplifier U1 represents a sum of a voltage across the system load ($V_{sys}$) and a predetermined reference voltage ($V_{ref}$). The sum of $V_{sys}$ and $V_{ref}$ is used as reference and is produced by an adder circuit (e.g., operational amplifier U1 and resistors R1, R2, and R13). The sum of $V_{sys}$ and $V_{ref}$ may be selected to match a desired minimum input voltage ($V_{DD}$). The output of operational amplifier U1 may be filtered. As shown in FIG. 2, a low-pass RC filter is implemented by capacitor C2 and resistors R3 and R15.

Operational amplifier U2 compares the sum of $V_{sys}$ and $V_{ref}$ with a divided version of $V_{DD}$. In this regard, the charger's input voltage ($V_{DD}$) is introduced to the negative input of operational amplifier U2 via a resistor divider (e.g., resistors R14 and R16). The input voltage ($V_{DD}$) is taken from the source side of transistor M2. Transistor M2 may serve as an ON/OFF switch and for over-voltage protection responsive to detection of an over-voltage event by over-voltage protection circuitry. When an over-voltage condition is not present and an AC power source has been detected, enable signals are sent to operational amplifier U2 and feedback functionality is initiated.

Accordingly, comparison of the predetermined voltage (e.g., the sum of $V_{sys}$ and $V_{ref}$) with the charger's voltage (e.g., the divided version of $V_{DD}$) is made by operational amplifier U2. Any difference/error thereby detected by operational amplifier U2 will cause its output to drive the resistance of transistor M5 towards zero as $V_{DD}$ becomes lower than the sum of $V_{sys}$ and $V_{ref}$ (Note: having the inverting input of operational amplifier U2 increasingly lower than the non-inverting input will cause it's output to be increasingly positive). Since the D+ line is coupled with the drain of the transistor, the output of operational amplifier U2 causes the voltage of the D+ line to decrease. This decrease is then output by the downstream device, such as by an output terminal coupled to a wire of a cable (e.g., a USB cable), so that it serves as feedback for an activation circuit of an AC adapter as previously described.

As shown in FIG. 2, transistor M5 is an N-channel enhancement-mode MOSFET. In other embodiments, transistor M6 may be replaced with a different type of transistor altogether, such as, for example, a BJT or a JFET. Furthermore, in other embodiments, additional transistors and/or other circuit components may be added to the detection circuit.

Advantageously, the embodiments of FIGS. 1 and 2 provide analog feedback. As a result, losses (e.g., drops in voltage at the downstream device) are compensated for automatically, which permits the system to self-regulate. For example, increased current load at the downstream device, for either the battery and/or the system load, will increase the consumption of current available from the AC adapter until it reaches a maximum current level. Once the current maximum is reached, a feedback request for a voltage increase is made in order to increase total available output power.

B. Output Power Path Management

Figure 3:
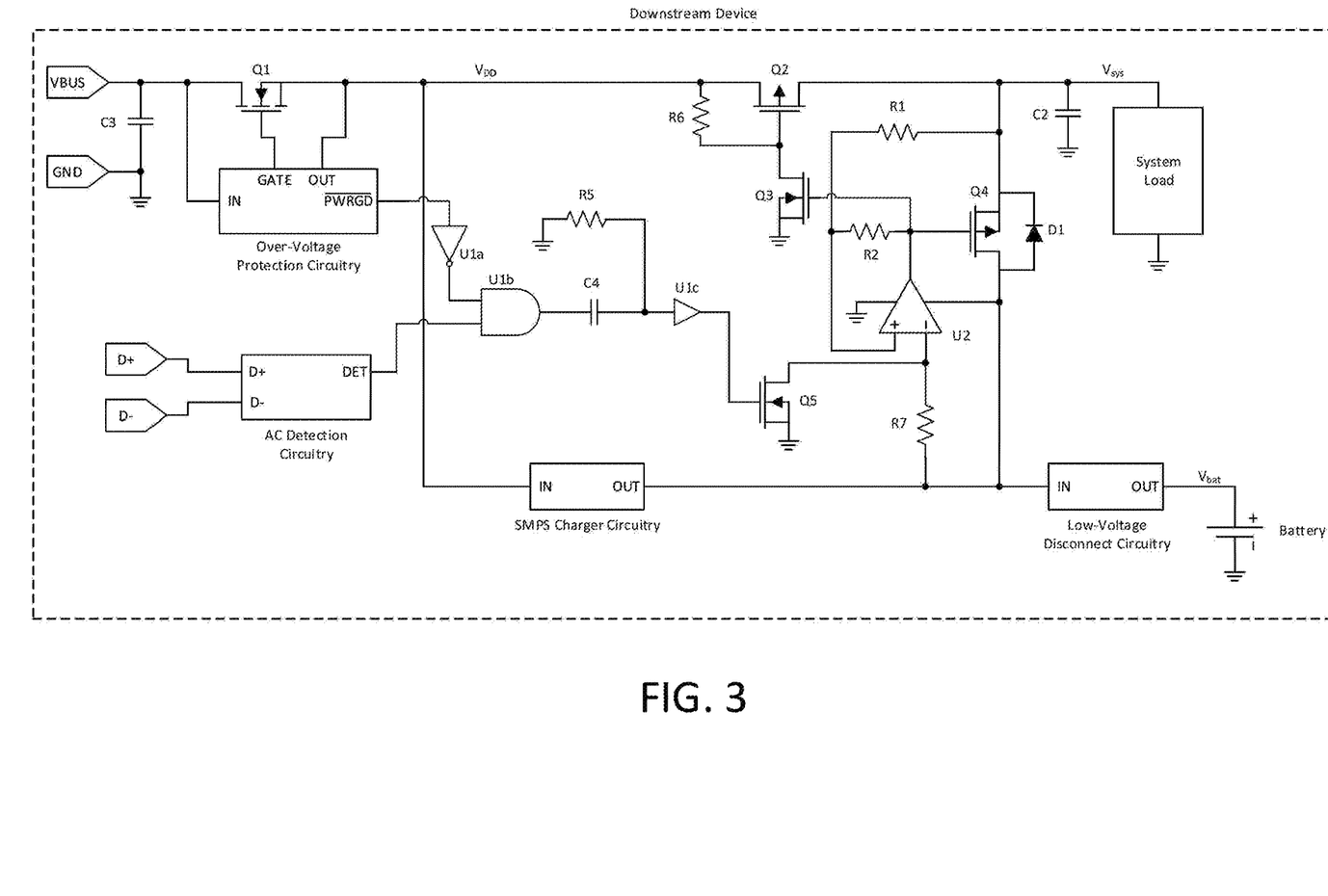
FIG. 3 illustrates an example circuit within a device in accordance with the present technology.

Some versions of the present technology may provide circuit components that cooperatively provide output power path management. For example, in FIG. 3 illustrates an example circuit within a device in accordance with the present technology. As shown in FIG. 3, the device includes a system load and a battery. The system load may include one or more processors, memories, communications subsystems, and/or sensors. The battery may, for example, be a lithium ion battery, a lithium polymer battery, a nickel cadmium battery, or a nickel metal hydride battery. The battery may also consist of a plurality of battery cells connected in series and/or parallel.

The device of FIG. 3 also includes a USB interface comprising VBUS, GND, D+, and D− lines. The VBUS and GND lines may be used to transfer power to and from the device. The D+ and D− lines may be used to transfer data to and from the device. One skilled in the art would readily appreciate that a USB interface may include additional lines. For example, some types of USB interfaces include an ID pin, which can be used for implementing USB OTG. For the purposes of the discussion below, the device of FIG. 3 will primarily be acting as a downstream device that is receiving power through the USB interface. However, the device may be capable of acting as a host or upstream device. Moreover, other types of standardized interfaces may be used to transfer power to the device, such as, for example, PoE.

The circuit illustrated in FIG. 3 includes capacitor C3, transistor Q1, and over-voltage protection circuitry. Collectively, these components protect the system load of the device from high voltages. As shown in FIG. 3, the over-voltage protection circuitry has at least four inputs/outputs (e.g., IN, OUT, GATE, and $\overline{\text{PWRGD}}$). The IN and OUT inputs are used to measure the voltage being supplied to the device FIG. 3. The GATE output is used to control transistor Q1. The $\overline{\text{PWRGD}}$ output can be used by the device of FIG. 3 to determine whether an over-voltage event has occurred. As shown in FIG. 3, the voltage at the $\overline{\text{PWRGD}}$ output ($V_{PWR}$) is low when no over-voltage events are detected. In other embodiments, $V_{PWR}$ is high when no over-voltage events are detected. In other embodiments, the DET output is replaced altogether with a communications interface, such as, for example, an inter-integrated circuit (I2C) interface or a serial peripheral interface bus (SPI). In some embodiments, the over-voltage protection circuitry may be implemented using a single integrated chip (IC), such as Linear Technology's LTC4360 over-voltage protection controller. In other embodiments, the over-voltage protection circuitry may be implemented using a plurality of discrete electrical components.

If an over-voltage event is detected (e.g., if the voltage across the VBUS and GND lines exceeds 5.8V), the over-voltage protection circuitry will turn "off" transistor Q1. Otherwise, transistor Q1 is "on". As shown in FIG. 3, transistor Q1 is an N-channel enhancement-mode MOSFET. In other embodiments, transistor Q1 may be replaced with an P-channel MOSFET. In other embodiments, transistor Q1 may be replaced with a different type of transistor altogether, such as, for example, a BJT or a JFET. Furthermore, in other embodiments, additional transistors and/or other circuit components may be added to ensure that voltages exceeding a certain threshold are not delivered to the system load. Similar adaptations can be made with respect to other transistors, such as Q2, Q3, Q4, and Q5.

The circuit illustrated in FIG. 3 also includes AC detection circuitry with at least three inputs/outputs (e.g., D+, D−, and DET). The AC detection circuitry can be used to determine whether an AC adapter is connected to the device of FIG. 3 through the USB interface. As shown in FIG. 3, this is accomplished by monitoring the D+ and D− lines. However, other lines of the USB interface may be used. U.S. application Ser. No. 10/087,629, now U.S. Pat. No. 6,936,936 and U.S. application Ser. No. 10/834,887, now U.S. Pat. No. 7,479,762, both of which are incorporated herein by reference, describe how the D+ and D− lines can be used to determine whether an AC adapter is connected. The DET output of the AC detection circuitry can be used to communicate whether an AC adapter is connected. As shown in FIG. 3, the voltage at the DET output ($V_{DET}$) is high when an AC adapter is connected. Otherwise, $V_{DET}$ is low. In other embodiments, $V_{DET}$ is low when an AC adapter is connected. Otherwise, $V_{DET}$ is high. In other embodiments, the DET output is replaced altogether with a communications interface, such as, for example, an I2C interface or an SPI interface. In some embodiments, the AC detection circuitry may be implemented using a single IC. In other embodiments, the AC detection circuitry may be implemented using a plurality of discrete electrical components.

The circuit illustrated in FIG. 3 also includes transistors Q2, Q3, Q4, and Q5, logic gates U1a, U1b and U1c, operational amplifier U2, diode D1, capacitor C4, and resistors R1, R2, R5, R6, and R7. Collectively, these components form a control circuit. During operation, transistor Q2 is "on" and transistor Q4 is "off" when (1) an AC adapter is connected and (2) no over-voltage event is detected. Otherwise, transistor Q2 is "off" and transistor Q4 is "on". When Q2 is "on" and transistor Q4 is "off", two separate power paths are created/employed. This allows all current allocated for battery charging to be independent from the needs of the system load. During this state, $V_{DD}$ is presented to $V_{sys}$ instead of $V_{bat}$. Furthermore, when transistor Q4 is "on" it shorts diode D1 and allows current to flow in both directions. Conversely, when transistor Q4 is "off", diode D1, when forward biased, allows current to flow from the battery to the system load. Diode D1 (i.e., transistor Q4's intrinsic body diode) prevents current from flowing in the opposite direction when $V_{sys}$ is higher than the $V_{bat}$.

The remaining components of the control circuit are used to implement the conditions for controlling transistors Q2 and Q4. As mentioned above, $V_{PWR}$ is low when no over-voltage events are detected and $V_{DET}$ is high when an AC adapter is connected. Logic "NOT" gate U1a inverts $V_{PWR}$. As a result, the output of logic "AND" gate U1b is only high when (1) an AC adapter is connected and (2) no over-voltage event is detected. The output of logic gate U1b is stabilized by the low pass filter implemented with capacitor C4 and resistor R5. The output from the filter is buffered by logic gate U1c. When the output of logic gate U1c is high, transistor Q5 is "on". When transistor Q5 is "on", the negative input of operational amplifier U2 is pulled low and the output of operational amplifier U2 is pulled into a high state. When the output of operational amplifier U2 is pulled into a high state, transistor Q4 is "off" and transistors Q2 and Q3 are "on". Resistors R1 and R2 add some hysteresis around the switching threshold of operational amplifier U2. Resistor R6 is used to provide a sufficient amount of voltage at the gate of transistor Q2 such that it is "off" when the output of operational amplifier U2 is in a low state and transistor Q3 is "off". Resistor R7 is used to pull the negative input of operational amplifier U2 into a high state when transistor Q5 is "off".

The circuit illustrated in FIG. 3 also includes SMPS charger circuitry, which regulates the amount of voltage and current delivered to the battery and/or the system load. In some embodiments, the SMPS charging circuitry may include, for example, Linear Technology's LTC4002 stand-alone Li-ion switch mode battery charger. In some embodiments, the SMPS charging circuitry may be implemented using a plurality of discrete electrical components. In other embodiments, the SMPS charging circuitry can be incorporated into the silicon design such that components include both the buck and the boost high efficiency SMPS functionality and the charger characteristics.

The circuit illustrated in FIG. 3 also includes low-voltage disconnect circuitry, which separates the battery from the system load when the voltage across the battery falls below a predetermined threshold (e.g., 2.7V or 3.2V). The low-voltage disconnect circuitry can protect the battery from deep discharge and potentially irreparable damage. In some embodiments, the low-voltage disconnect circuitry may include, for example, Linear Technology's LTC4071 charger system with low battery disconnect. In some embodiments, the low-voltage disconnect circuitry may be implemented using a plurality of discrete electrical components.

Figure 4:
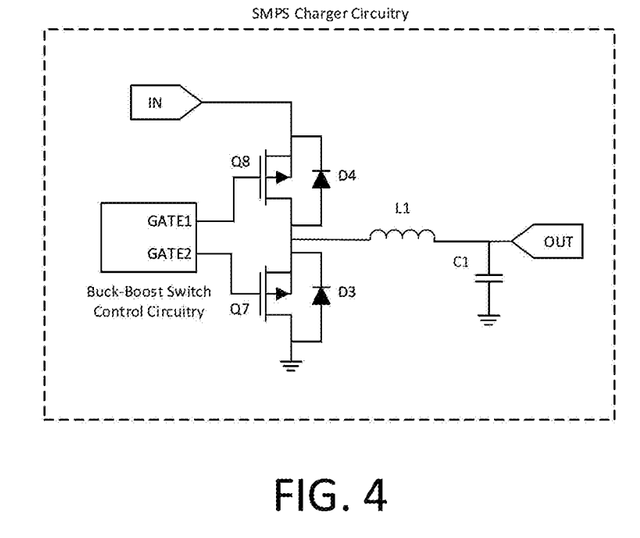
FIG. 4 illustrates an example SMPS circuit in accordance with the present technology.

FIG. 4 illustrates how an SMPS charging circuit can be incorporated into the silicon design such that components include both the buck and the boost high efficiency SMPS functionality and the charger characteristics. In the embodiment of FIG. 4, this accomplished through the use of buck-boost control circuitry, transistors Q7 and Q8, diodes D3 and D4, inductor L1, and capacitor C1. In buck mode, transistor Q8 acts as high-side-switch and transistor Q7 acts as low-side-switch/diode. Conversely, while in the boost mode, transistor Q8 acts as low-side-switch and transistor Q7 can utilize it's intrinsic body diode (i.e., diode D3) as a rectifier-diode. Other versions of such a circuit may be implemented.

Figure 5:
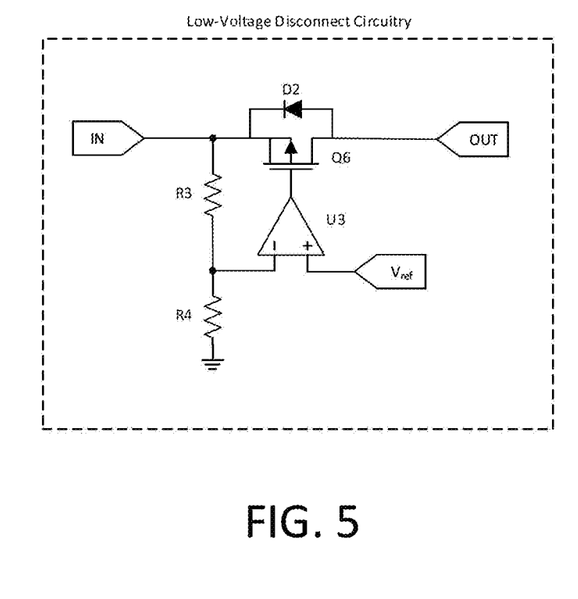
FIG. 5 illustrates an example low-voltage disconnect circuit in accordance with the present technology.

FIG. 5 illustrates an example low-voltage disconnect circuit that may be implemented in some versions of the present technology, where "out" is coupled with the battery and "in" may be selectively coupled with the system load. (See, e.g., the embodiment of FIG. 3). As explained above, a low-voltage disconnect circuit can be used to separate a battery from a system load when the voltage across the battery falls below a predetermined threshold (e.g., $V_{ref}$). In the embodiment of FIG. 5, this is accomplished through the use of operational amplifier U3, transistor Q6, diode D2, and resistors R3 and R4. As shown in FIG. 5, operational amplifier U3 is being used as a comparator. When the voltage at the negative input of operational amplifier U3 is less than $V_{ref}$, the output of operational amplifier U3 is pulled high, which causes transistor Q6 to turn "off". Conversely, when the voltage at the negative input of operational amplifier U3 is greater than $V_{ref}$, the output of operational amplifier U3 is pulled low, which causes transistor Q6 to turn "on". When transistor Q6 is "on" it shorts diode D2 and allows current to flow in both directions. Conversely, when transistor Q6 is "off", diode D2 allows current to flow from the battery to the system load and diode D2 (i.e., transistor Q6's intrinsic body diode) prevents current from flowing in the opposite direction.

Figure 6:
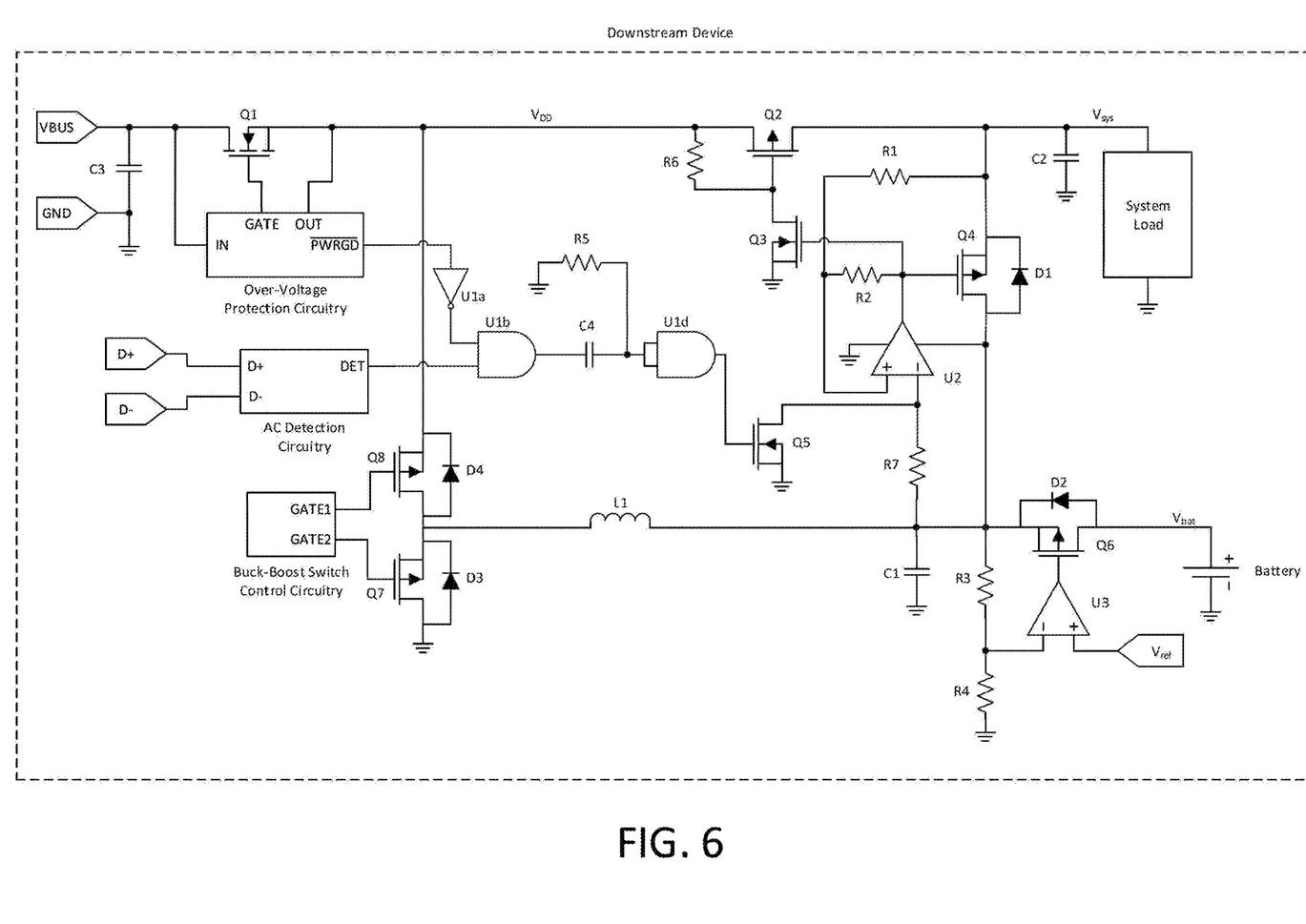
FIG. 6 illustrates an example circuit within a device in accordance with the present technology.

FIG. 6 illustrates another example circuit that may be implemented within a device in accordance with the present technology. The circuit of FIG. 6 is similar to the circuit of FIG. 3. However, in FIG. 6, the SMPS charger circuitry has been replaced with the circuit of FIG. 4. Similarly, the low-voltage disconnect circuitry has been replaced with the circuit of FIG. 5. Furthermore, the circuit of FIG. 6 demonstrates the control circuitry can be changed without affecting the behavior of transistors Q2 and Q4. In FIG. 6, buffer U1c has been replaced with logic "AND" gate U1d.

Figure 7:
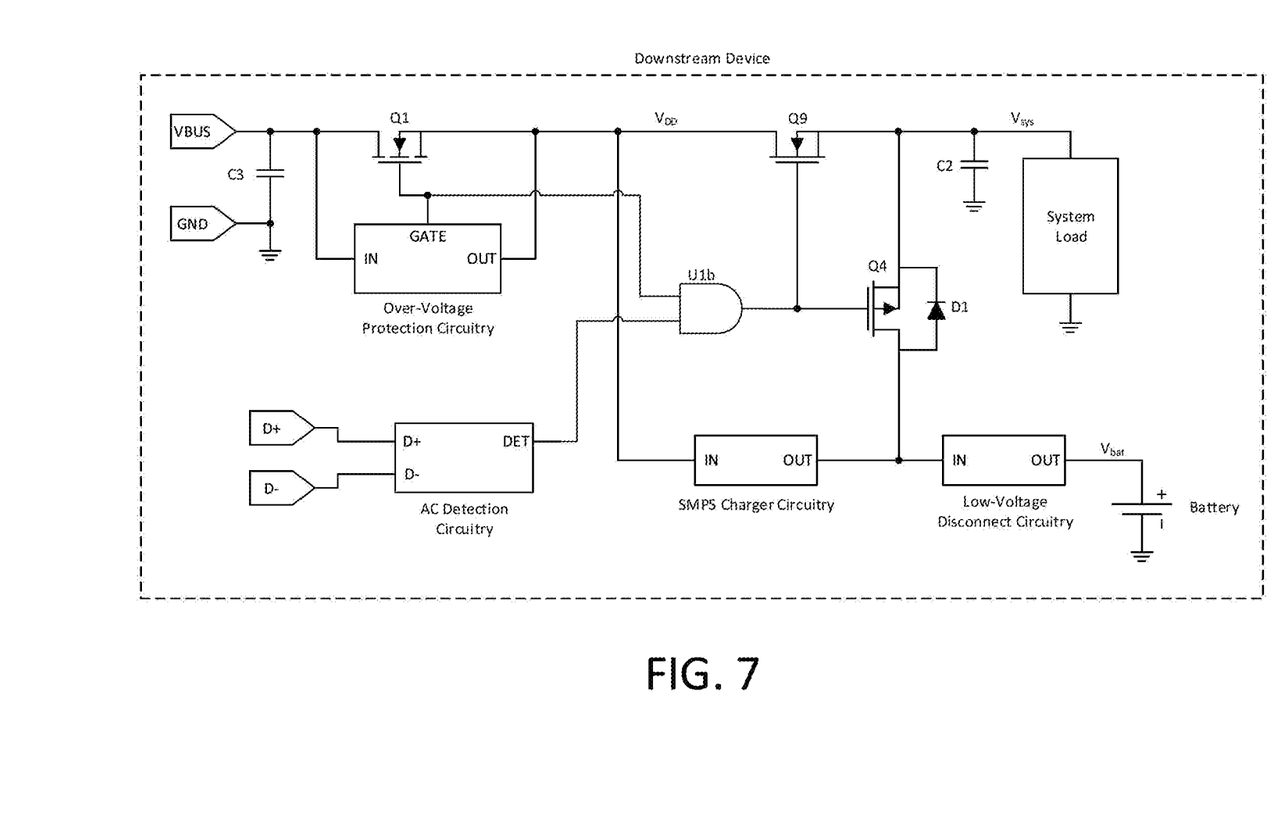
FIG. 7 illustrates an example circuit within a device in accordance with the present technology.

FIG. 7 illustrates yet another example circuit for a downstream device in accordance with the present technology. In comparison to the embodiment of FIG. 3, the control circuitry in FIG. 7 is illustrated with fewer components. First, logic "AND" gate U1b is connected to the GATE output of the over-voltage protection circuitry instead of the $\overline{PWRGD}$ output. As shown in FIG. 7, the voltage at the GATE output ($V_{GATE}$) is high when no over-voltage events are detected. As a result, in comparison to the embodiment of FIG. 3, the behavior of logic "AND" gate U1b remains unchanged. Moreover, in the embodiment of FIG. 7, transistor Q2 has been replaced with transistor Q9, which is an N-channel depletion-mode MOSFET. Lastly, the gates of transistors Q4 and Q9 are tied directly to the output of logic "AND" gate U1b. During operation, transistor Q9 is "on" and transistor Q4 is "off" when (1) an AC adapter is connected and (2) no over-voltage event is detected. Otherwise, transistor Q9 is "off" and transistor Q4 is "on". Much like the embodiment of FIG. 3, this allows all current allocated for battery charging to be independent from the needs of the system load.

Figure 8:
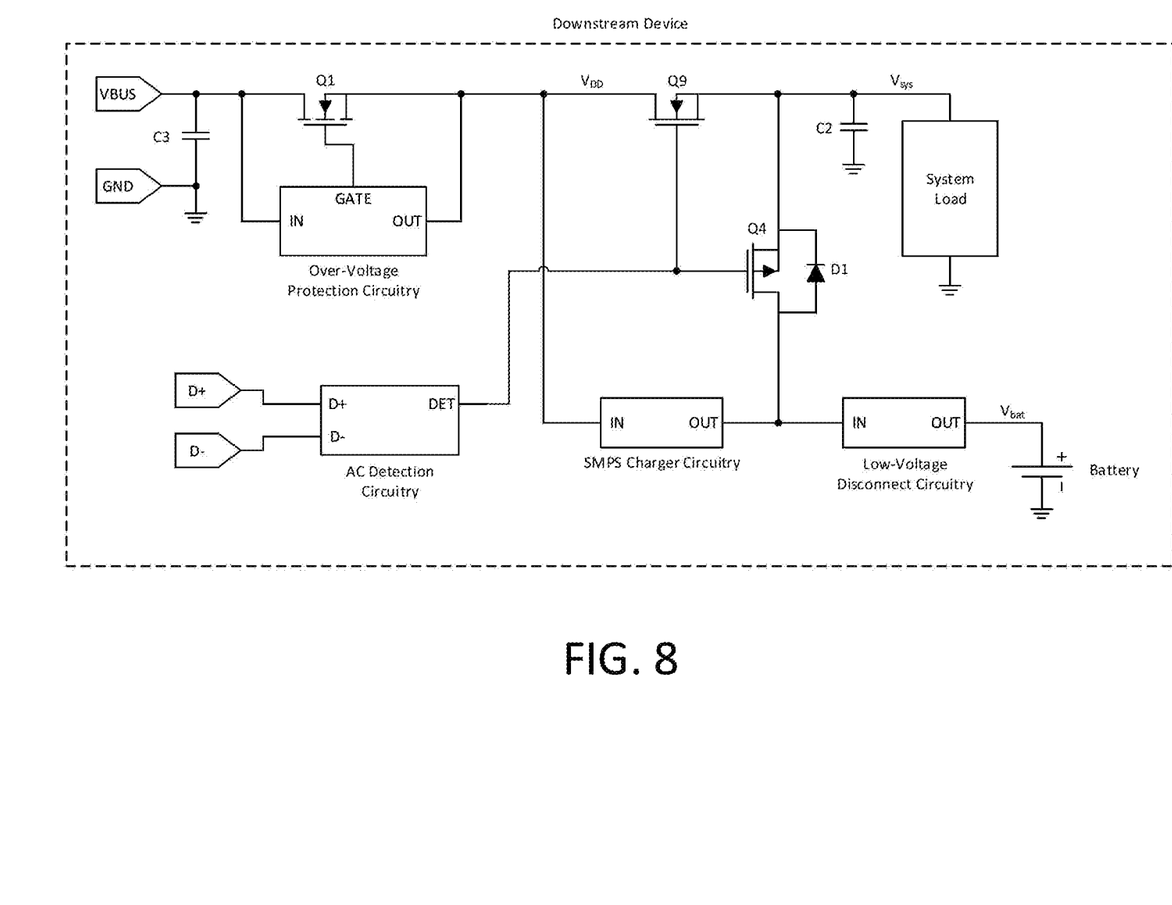
FIG. 8 illustrates an example circuit within a device in accordance with the present technology.

FIG. 8 illustrates yet another example circuit for a downstream device in accordance with the present technology. The circuit of FIG. 8 is similar to the circuit of FIG. 7. However, in the circuit of FIG. 8, logic "AND" gate U1b has been removed. As a result, the presence or absence of over-voltage events no longer affects transistors Q4 and Q9. Instead, during operation, transistor Q9 is "on" and transistor Q4 is "off" when an AC adapter is connected. Otherwise, transistor Q9 is "off" and transistor Q4 is "on".

From the foregoing and with reference to the various figure drawings, those skilled in the art will appreciate that certain modifications can also be made to the present disclosure without departing from the scope of the same. For example, the feedback circuit features may be implemented with the power path management features in additional embodiments of the present technology. Thus, while several embodiments of the disclosure have been shown in the drawings, it is not intended that the disclosure be limited thereto, as it is intended that the disclosure be as broad in scope as the art will allow and that the specification be read likewise. Therefore, the above description should not be construed as limiting, but merely as exemplifications of particular implementations. Those skilled in the art will envision other modifications within the scope and spirit of the claims appended hereto.

The invention claimed is:

1. An apparatus for adapting an alternating current to a direct current, the apparatus comprising:
   a power supply input terminal for the apparatus, the power supply input terminal configured to removably couple to an alternating current (AC) power source and to receive the alternating current;

a switched mode power supply (SMPS) configured to operate with energy supplied from the AC power source via the power supply input terminal, the SMPS configured to generate a supply voltage for a direct current (DC) charger circuit supplied by the SMPS; the SMPS further configured to adjust a voltage level of the supply voltage depending on a feedback signal applied at a feedback input to the SMPS;

input terminals configured to receive signals from the DC charger circuit, wherein at least one of the received signals is an analog signal responsive to a drop in the supply voltage in the DC charger circuit, an activation circuit coupled to the input terminals, wherein the activation circuit is configured to activate the feedback signal to increase the voltage level in response to the at least one of the received signals, wherein the activation circuit comprises a first operational amplifier and a first transistor, and wherein the first operational amplifier is configured to compare the received signals from the input terminals and activate the first transistor to change a voltage signal at the feedback input from the comparison; and an output terminal from the apparatus, the output terminal configured to provide the voltage level from the SMPS for operating the DC charger circuit.

2. The apparatus of claim 1, wherein the activation circuit includes a filter circuit coupled to at least one of the input terminals, and wherein the filter circuit is configured to filter a reference signal applied to the first operational amplifier.

3. The apparatus of claim 1, further comprising the DC charger circuit, wherein the DC charger circuit includes a detection circuit configured to detect the drop in the supply voltage in the DC charger circuit, the detection circuit comprising a second operational amplifier configured to compare the supply voltage and a predetermined voltage.

4. The apparatus of claim 3, wherein the detection circuit further comprises a second transistor coupled to an output of the second operational amplifier, the second transistor configured to induce the at least one of the received signals.

5. The apparatus of claim 3, wherein the predetermined voltage is a sum of a system supply voltage level and a reference voltage level, wherein the detection circuit further comprises an adder circuit configured to produce the predetermined voltage from the system supply voltage level and the reference voltage level.

6. The apparatus of claim 3, further comprising a universal serial bus cable including a pair of data lines, and wherein the received signals are transmitted over the data lines.

7. The apparatus of claim 3, wherein the activation circuit and the detection circuit operate with the switched mode power supply to maintain a substantially constant supply voltage for the DC charger circuit.

8. The apparatus of claim 1, further comprising a flexible wire bus, wherein wires of the flexible wire bus are adapted to couple with terminals of the DC charger circuit and the input terminals of the apparatus.

9. The apparatus of claim 8, wherein the flexible wire bus is a universal serial bus cable.

* * * * *